United States Patent [19]

Hoshi

[11] Patent Number: 5,196,932
[45] Date of Patent: Mar. 23, 1993

[54] IMAGE SIGNAL TRANSMISSION APPARATUS

[75] Inventor: Nobuhiro Hoshi, Yokohama, Japan

[73] Assignee: Canon Kabushiki Kaisha, Tokyo, Japan

[21] Appl. No.: 690,612

[22] Filed: Apr. 24, 1991

[30] Foreign Application Priority Data

Apr. 26, 1990 [JP] Japan .................................. 2-108914

[51] Int. Cl.$^5$ ............................................ H04N 7/137
[52] U.S. Cl. ..................................... 358/135; 358/13; 358/138
[58] Field of Search .................... 358/138, 135, 136, 13

[56] References Cited

U.S. PATENT DOCUMENTS

| | | | |
|---|---|---|---|
| 4,716,453 | 12/1987 | Pawalski | 358/138 X |
| 4,782,387 | 11/1988 | Sabri et al. | 358/138 X |
| 4,860,314 | 8/1989 | Boisson | 358/13 X |
| 4,924,298 | 5/1990 | Kitamura | 358/138 X |

*Primary Examiner*—Victor R. Kostak
*Attorney, Agent, or Firm*—Robin, Blecker, Daley & Driscoll

[57] ABSTRACT

In an image signal processing apparatus, first image data and second image data comprising a plurality of different sample data are input at the same time and are output sequentially following processing wherein data is subjected to thinning-out in direction horizontally of a screen so as to make locations of vertical direction screen data different from each other between the odd-number field period and the even-number field period. The thinned-out sample data are prediction-coded to output prediction-coded data, thus resulting in a substantial reduction of data quantity without deteriorating picture quality.

14 Claims, 6 Drawing Sheets

○ ---- $P_R$
△ ---- $P_B$
× ---- THINNED PIXEL

IMAGE SIGNAL TRANSMISSION APPARATUS

BACKGROUND OF THE INVENTION

1. Field of the Invention

The present invention relates to an image signal processing apparatus which processes image signals.

2. Related Background Art

Traditionally, as an apparatus to process image signals, there is an image signal coding apparatus which, in making digital transmission of image data obtained by digitalizing image signals, reduces the amount of data by compression-coding. One of the known coding methods applicable in the image signal coding apparatus is Differential Pulse Code Modulation (hereinafter referred to as DPCM), which compresses the amount of data by utilizing such characteristics as to create a close correlation between adjacent sample values in respect to samplings or image signals. This reduces the amount of pixel data, say into one-half, obtained by sampling and digitalizing the image signals. There is also a method to use compression-coding methods in combination. In this case, for the two kinds of color differential signals, respective sample data are reduced into one-half in the vertical direction of both the sides to make color differential line sequencing and further the sample data are halved in the horizontal direction of the screen to conduct DPCM.

Figure 1:
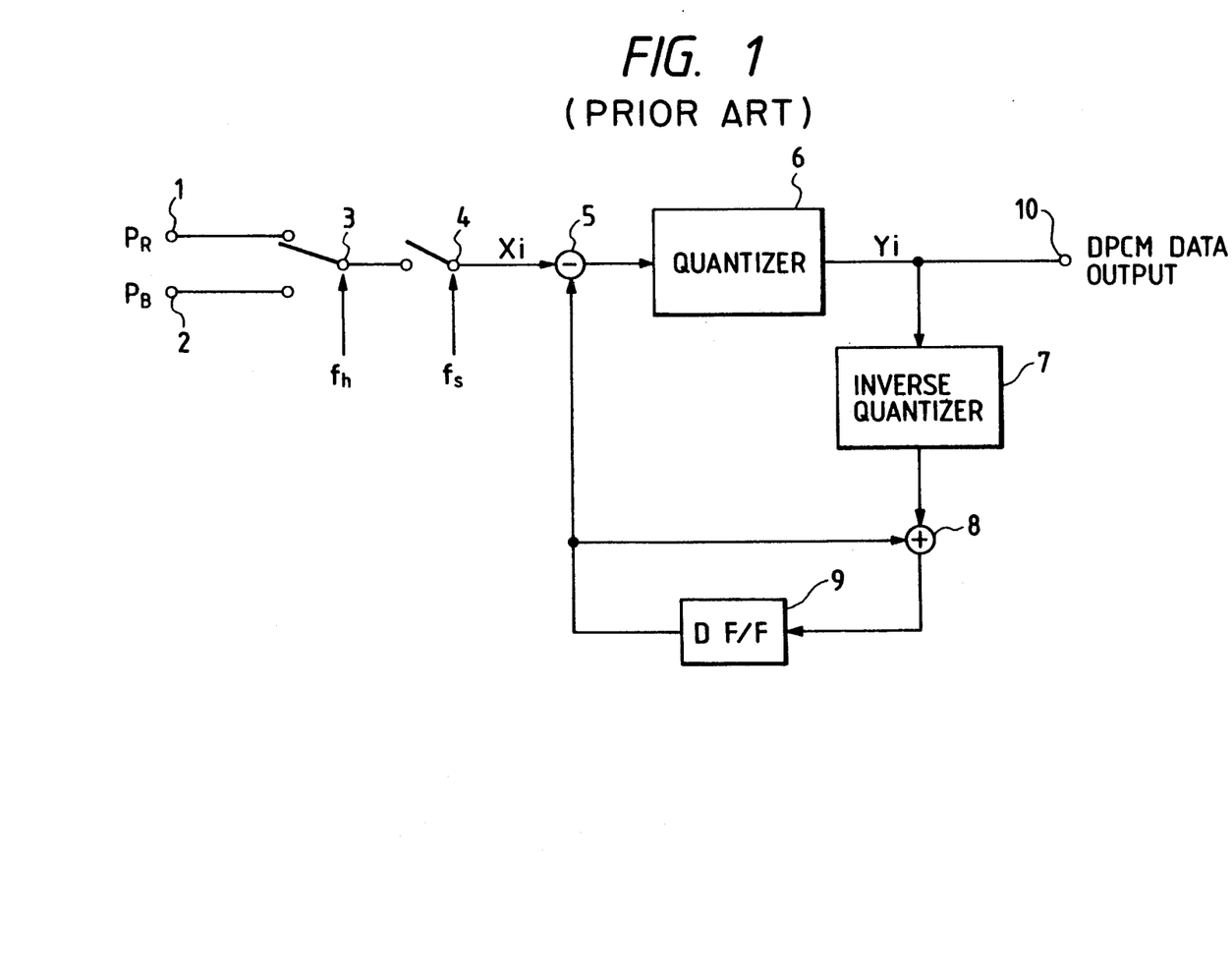
FIG. 1 shows the configuration of a conventional coding apparatus.
Figure 2:
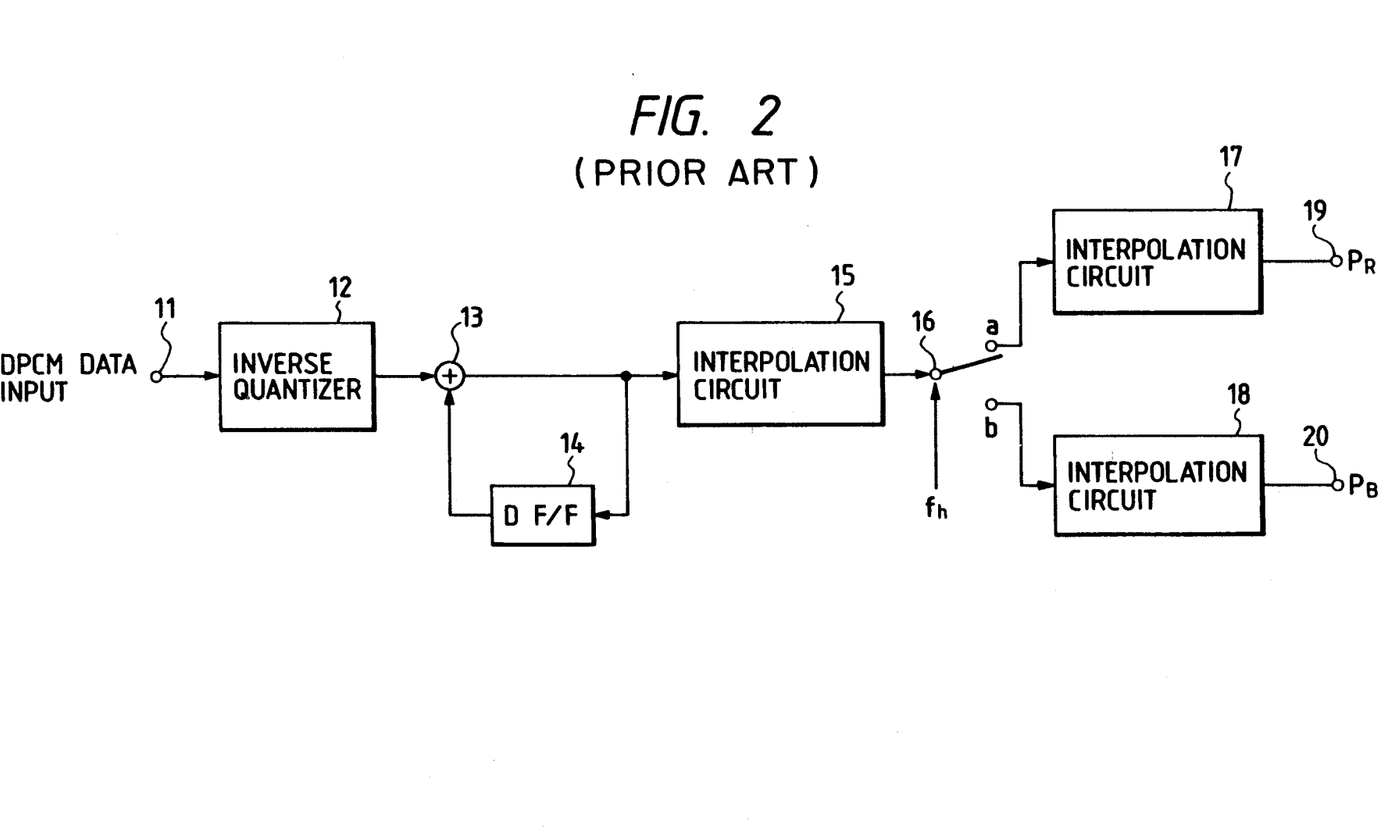
FIG. 2 shows the configuration of a conventional decoding apparatus which corresponds to the coding apparatus shown in FIG. 1.

FIG. 1 is a drawing showing a configuration of a conventional coding apparatus. The apparatus is designed to conduct the compression coding of color differential signals as mentioned above. FIG. 2 shows configuration of conventional decoding apparatus which corresponds to the coding apparatus shown in FIG. 1. FIGS. 3A to 3F are drawings to explain the operation of a conventional coding apparatus of FIG. 1 and a coding apparatus as one of the embodiments of the present invention which are explained later.

To start with, explanation is made about the operation of coding.

Figure 3A:
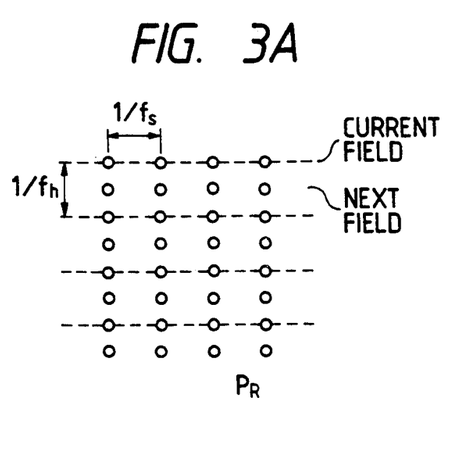
FIGS. 3A-3F illustrate operation of coding apparatus as one of the later-stated embodiments of the present invention as well as conventional coding apparatus shown in FIG. 1.
Figure 3B:
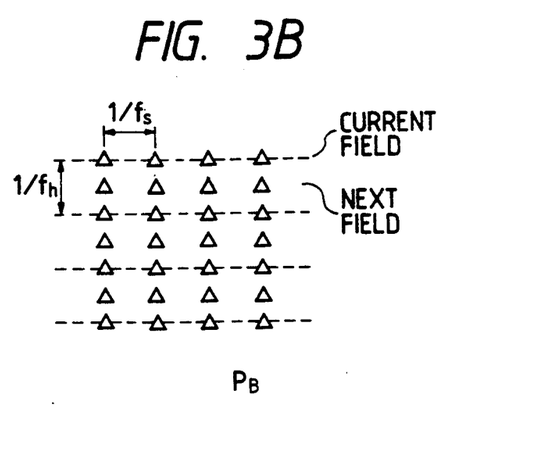
Figure 3C:
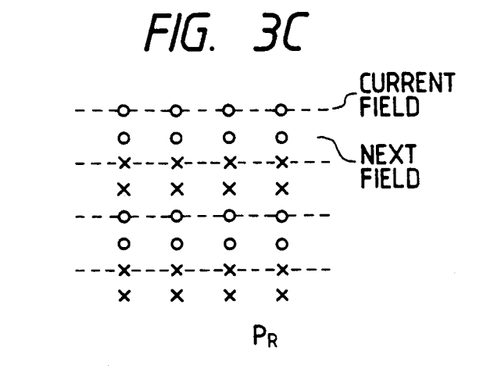
Figure 3D:
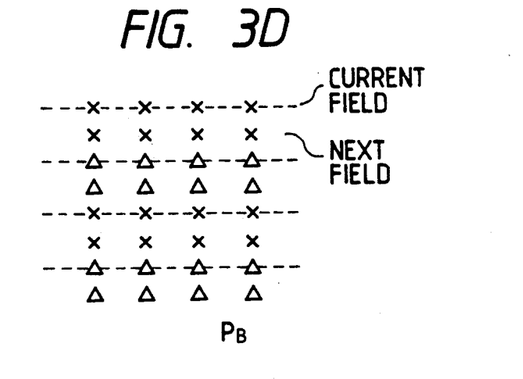
Figure 3E:
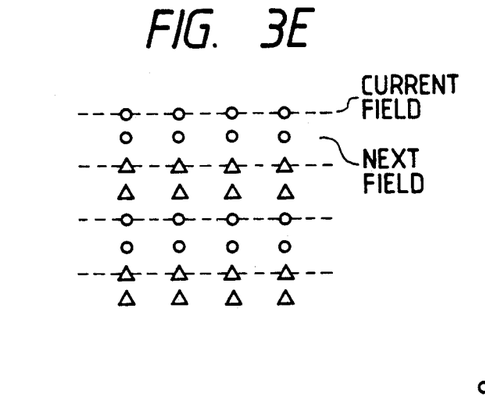

In FIG. 1, each of the two kinds of color differential data PR and PB, which have been sampled at specified sampling frequency, is input to respective input terminals 1 and 2. Then, by the operation of the switch 3 which can be switched over for each single horizontal scanning period by the horizontal synchronizing signal $f_s$, the differential data are reduced into one-half in the vertical direction of the screen, subjected to the color differential line sequencing as shown in FIG. 3E and then supplied to the switch 4.

Figure 3F:
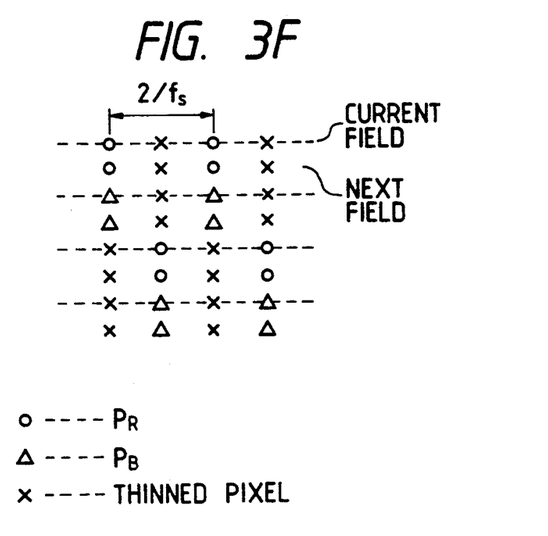

The switch 4 is turned on/off with the sampling offsets, as shown in FIG. 3F, the color differential data which have been line-sequenced with the above switch 3 frequency fs to reduce the data into one-half in the horizontal direction of the screen, which are then supplied to the subtracter 5. At subtracter, the predicted value data the preceding the value on output from the D flip-flop 9 is reduced from the input sample value data $x_i$. The quantizer 6 quantizes the differential value data supplied from the subtracter 5 and outputs the DPCM data $y_i$ from the output terminal 10. The inverse quantizer 7 inversely quantizes the DPCM data $y_i$ output from the above quantizer 6 to output the differential representative value data. The adder 8 adds the predicted value to the preceding value data supplied from the above D flip-flop 9 to the differential representative value data output from the inverse quantizer 7 and then supplies it again to the D flip-flop 9. Then, the D flip-flop 9 delays the data supplied from the adder 8 by the amount corresponding to one sampling period and supplies them, as the predicted value data on the preceding data, to the subtracter 5 and the adder 8.

The operation of decoding is now explained.

To the input terminal 11 are fed, via a transmission line, the DPCM data which are output from the coding apparatus shown in the above FIG. 1. The inverse quantizer outputs the differential representative value data by inversely quantizing the DPCM data. The adder 13 adds and outputs the decoded value data on the preceding value supplied from the later-explained D flip-flop to the differential representative value data, which are output from said inverse quantizer. The data output from the adder 13 are delayed at the D flip-flop 14 by the amount corresponding to one sampling period and fed back to the above adder 13 as the decoded value data on the preceding value. The data output from the adder 13 are supplied to the interpolation circuit 15. In the interpolation circuit 15, each of the color differential data $P_R$ and $P_B$, reduced to one-half in horizontal direction of the screen as shown in FIG. 3F, is subjected to interpolation processing and supplied to the switch 16. The switch 16 supplies the color differential data $P_R$ to the interpolation circuit 17 and the color differential data $P_B$ to the interpolation circuit 18 by switching alternately between the a terminal and the b terminal in synchronization with the horizontal synchronization signal $f_h$. As shown in FIG. 3C, the interpolation circuit 17 outputs the color differential data P from the output terminal 19 as the color differential data $P_R$ shown in FIG. 3A by subjecting the data to the interpolation processing in the vertical direction of the screen. The interpolation circuit 18, as shown in FIG. 3D, outputs the color differential data $P_B$ from the output terminal 20 as the color differential data $P_B$ shown in FIG. 3B by subjecting them to the interpolation processing in the vertical direction of the screen.

However, in the above conventional example of coding apparatus and decoding apparatus, since the sample data are reduced to one-half in horizontal direction of the screen prior to the implementation of DPCM, the distance between each example data on the screen becomes 2/fs (fs means sampling frequency). Thus, the correlation between each sample data is less close, thereby causing a problem of large error of prediction.

SUMMARY OF THE INVENTION

A purpose of the present invention is to provide the image signal processing apparatus which solves the above problems.

Another purpose of the present invention is to provide an image signal processing apparatus which reduces the predictable error substantially and restricts the deterioration of picture quality.

Under such purpose, according to the present invention, there is provided image signal processing apparatus which processes image signals, comprising line sequential output means for simultaneously inputting first image data and second image data consisting of a plurality of different sample data and for sequentially outputting said first and second image data thus input by each horizontal period data thinning-out means for performing a thinning-out processing on sample data output by the line sequential output means and for outputting the data so as to vary the location of the vertical direction of the sample data on the screen between the odd-number field period and the even-number field period, and providing prediction coding means for prediction coding the sample data output from the data thinning means and for outputting data thus obtained.

Another purpose of the present invention is to provide an image signal processing apparatus which is capable of reducing the amount of image data substantially without deteriorating picture quality.

Under such purpose, according to the present invention, there is provided an image signal processing apparatus which processes an image signal as one of the embodiments, comprising line sequential output means for simultaneously inputting first image data and second image data consisting of a plurality of different sample data and for sequentially outputting the first image data and second image data which are input, by one horizontal period, data thinning-out means for performing thinning-out processing on sample data output from the line sequential output means in a direction horizontal to the screen so as to interleave a position of the sample data on the odd-number field screen and a position of sample data on the even-number field screen and for outputting the processed sample data, and prediction coding means for prediction coding the sample data output from the data thinning-out means and for outputting data thus coded.

Purposes of the present invention other than the above and their characteristics will become evident from the detailed explanation about the working modes of the invention with reference to the drawings which follow below.

DETAILED DESCRIPTION OF THE PREFERRED EMBODIMENTS

Below explained is the present invention based on embodiments of the present invention.

Figure 4:
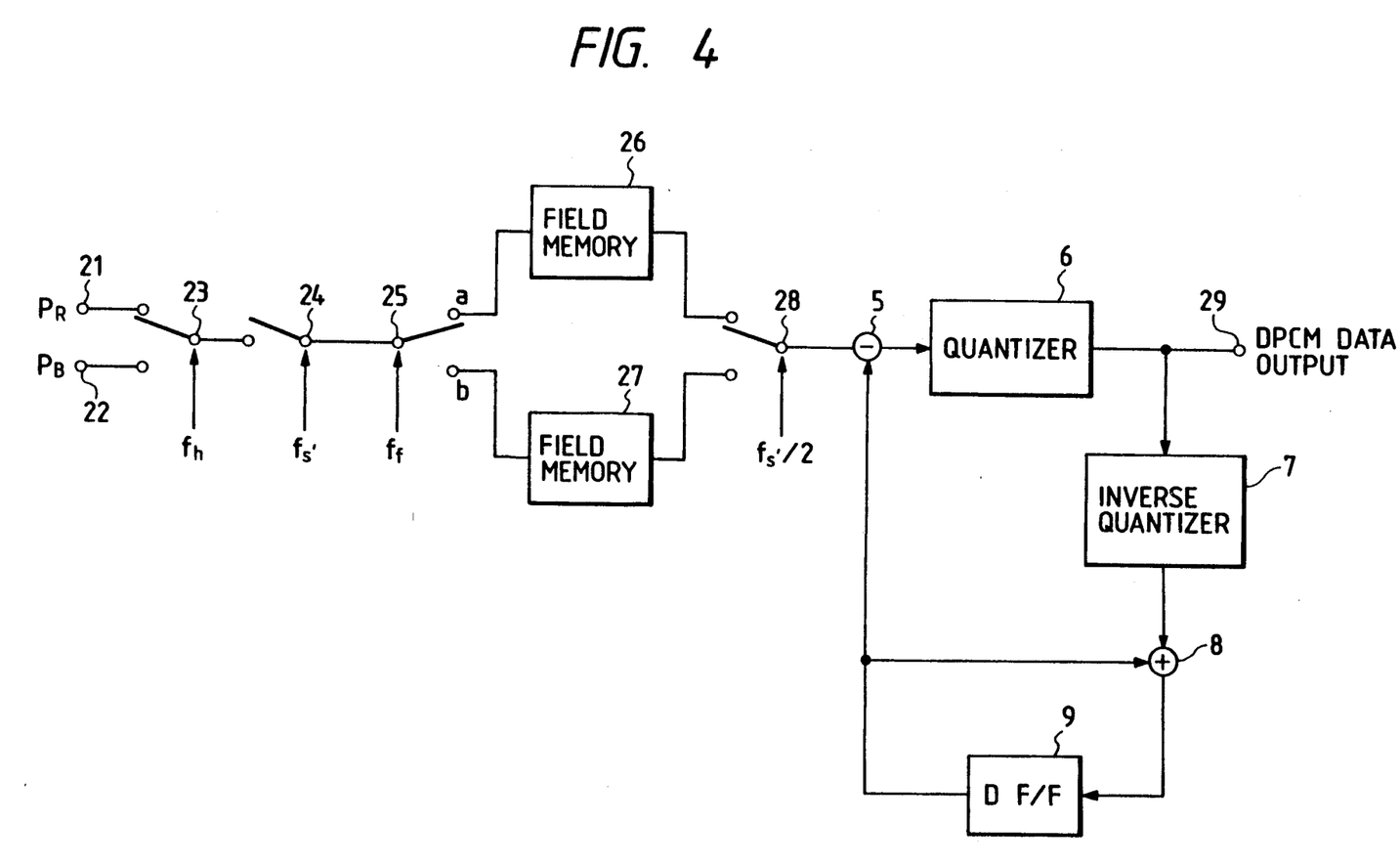
FIG. 4 shows the configuration of coding apparatus to which the present invention is applied, as one embodiment of the invention.
Figure 5:
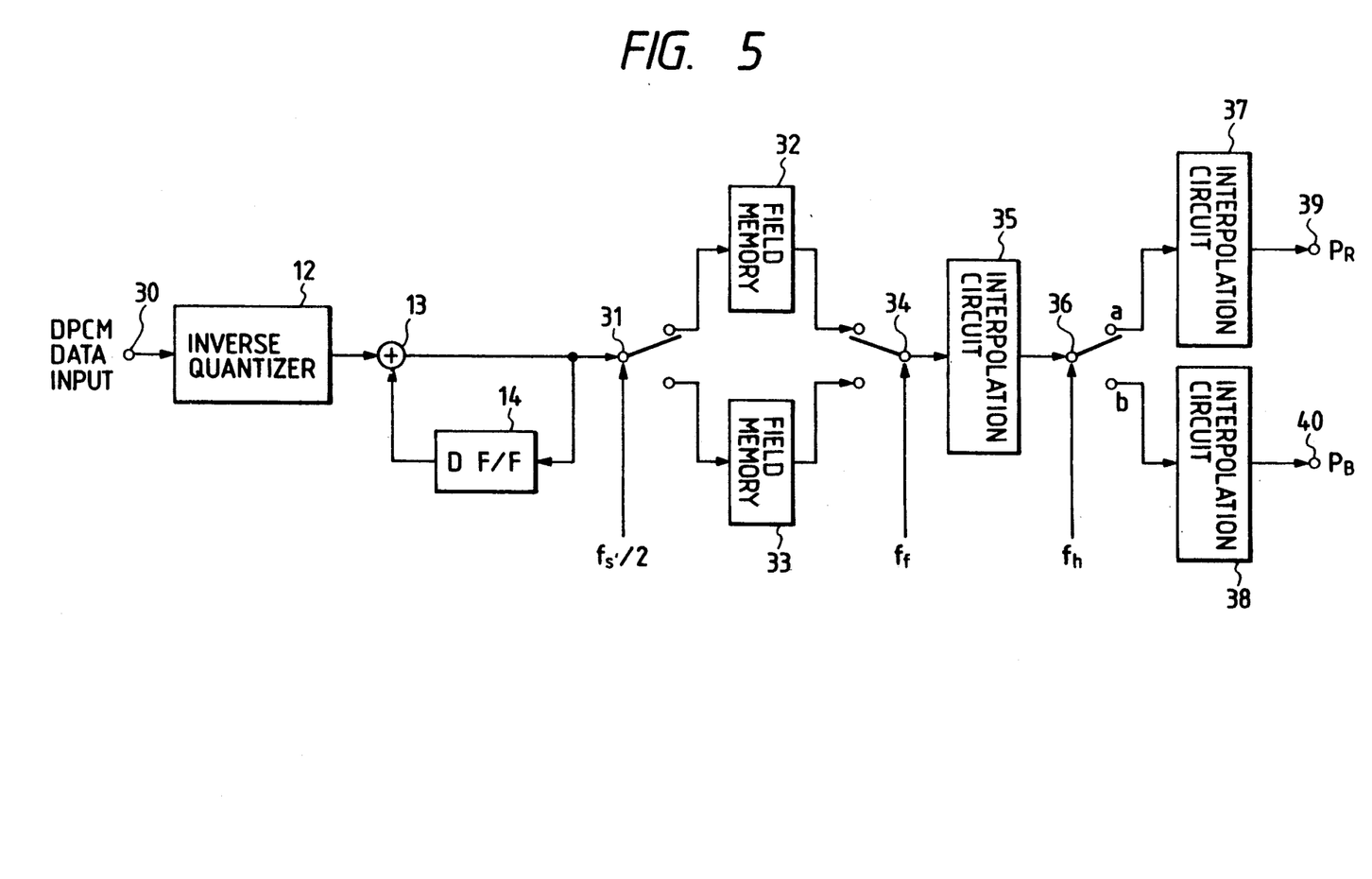
FIG. 5 shows the configuration of decoding apparatus which corresponds to the coding apparatus shown in FIG. 4.
Figure 6:
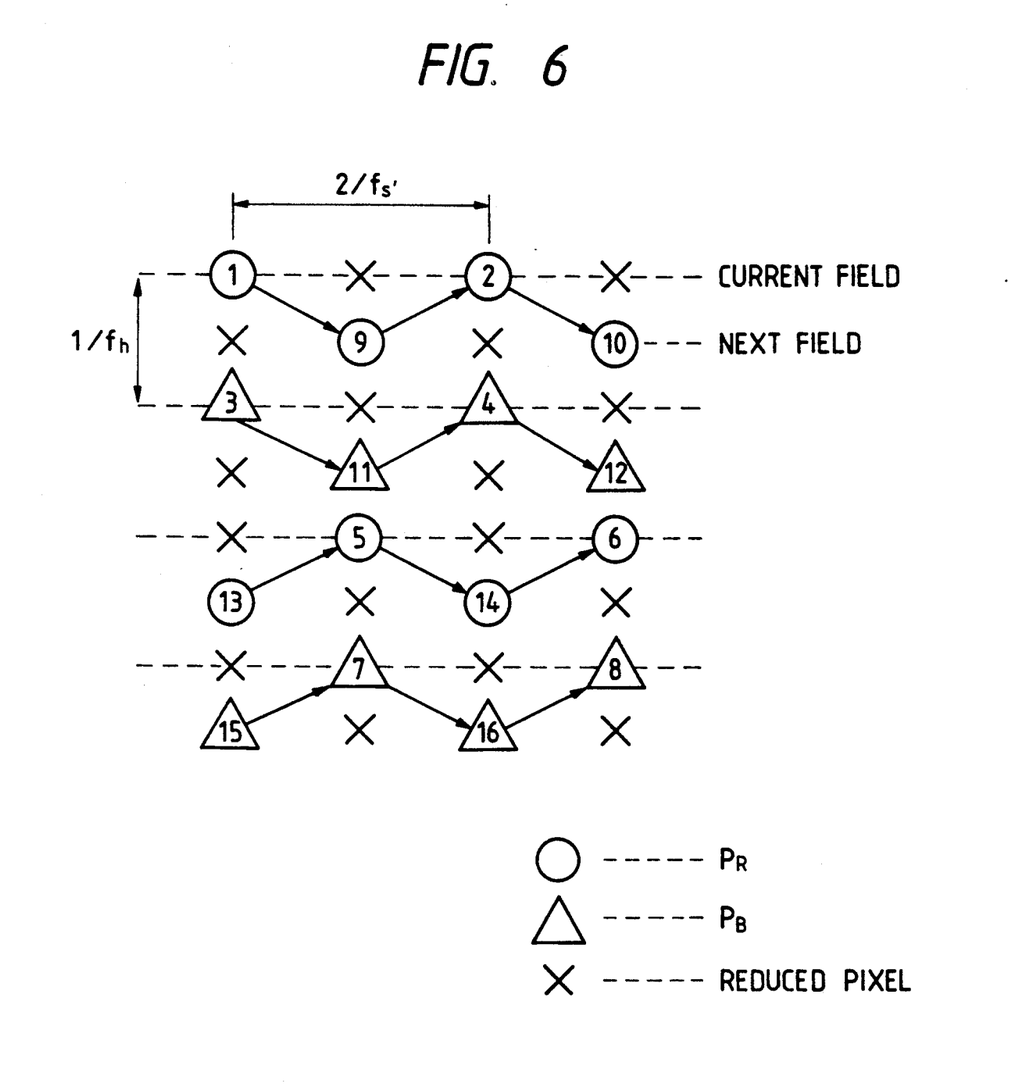
FIG. 6 illustrates the coding and decoding operations in embodiments of the invention.

FIG. 4 shows the configuration of the coding apparatus to which the present invention is applied as one embodiment. FIG. 5 shows the configuration of the decoding apparatus which corresponds to the coding apparatus specified in the above FIG. 4. FIG. 6 illustrates the operation of coding and decoding in the present embodiment. To begin with, the operation of coding is explained.

In FIG. 4, each of two kinds of color differential data $P_R$ and $P_B$ which were sampled with a specified sampling frequency is input to respective input terminals 21 and 22. Then, by the operation of the switch 23 which can be switched over by the horizontal synchronizing signal $f_h$ for each one of the horizontal scanning periods, each of the data is reduced to one-half in the vertical direction of the screen. The sample data thus reduced in quantity are, as shown in FIG. 3E, sequenced for color differential and supplied to the switch 24. The switch 24 offsets color differential data, which were sequenced at the above switch 23, for each horizontal scanning line. The data are reduced to one-half in the horizontal direction of the screen by turning on and off the switch 24 at the sampling frequency f's so that the above offsetting will also be made for each field. The structure of sample data output from switch 24, which have been reduced in quantity, is as shown in FIG. 6.

The color differential data whose amount has been reduced by the switch 24 are supplied to the switch 25. The switch 25 is synchronized at the vertical synchronizing frequency $f_h$ and connected to the "a" terminal in the Figure during the present field period and to the "b" terminal in the Figure during the next field period. Thus, connection is changed alternately for each field period. In the field memory 26, sample data are written in the order of ①−② ... ⓐ ⓐ ... ⑤−⑥ ... ⓐ−ⓐ ... in FIG. 6. For the field memory 27, the sample data are written in the order of ⑨−⑩ ... ⓐ−ⓐ ... ⑬−⑭ ... ⓐ−ⓐ ... in the FIG. 6. The switch 28 is changed over at the frequency of f's/2 so that the color differential data written in the field memories 26 and 27 will be output in the order of ①−⑨−②−⑩ ... ⓐ−ⓐ−ⓐ−ⓐ ... ⑬−⑤−⑭−⑥ ... ⓐ−ⓐ−ⓐ−ⓐ ... The data are then supplied to the subtractor 5. The order of the DPCM coding should be the one indicated with an arrow in FIG. 6. With respect to the structure of DPCM coding, the same numbering as given for the conventional coding equipment shown in the above FIG. 1 is given and overlapping explanation is omitted. The DPCM data coded by DPCM are output from the output terminal 29. The decoding operation of this embodiment is now explained.

In FIG. 5, with respect to the structure for processing the same DPCM decoding as in the case of the conventional decoding apparatus of FIG. 2, the same numbering as in FIG. 2 is given, and overlapping explanation is omitted.

The decoded value data of color differential data output from the adder of FIG. 5 are supplied to the switch 31. The order of the decoded value data output from the adder 13 is shown in FIG. 6 with arrows. The switch 31 is changed over at the frequency of f's/2 that the decoded value data decoded with DPCM will be written in the field memory 32 in the order of ①−② ... ⓐ″ⓐ ... ⑤−⑥ ... ⓐ−ⓐ in FIG. 6 and in the field memory 33 in the order of ⑨−⑩ ... ⓐ−ⓐ ... ⑬−⑭ ... ⓐ−ⓐ ... Then, the switch 34 is changed over according to the vertical synchronizing signal $f_h$ so that the decoded value data written in the field memories 32 and 33 will be output to the interpolation circuit 35 in the order of ①−② ... ⓐ−ⓐ ... ⑤−⑥ ... ⓐ−ⓐ ... ⑨−⑩ ... ⓐ−ⓐ ... ⑬−⑭ ... ⓐ−ⓐ in FIG. 6.

In the interpolation circuit 35, the decoded value data reduced to one-half in the horizontal direction of the screen as shown in FIG. 6 are subjected to interpolation processing in the manner shown in the above FIG. 3E and then output to the switch 36. The switch 36, synchronized at the horizontal synchronizing signal frequency $f_h$, is changed over to between the "a" terminal side and the "b" terminal side of the Figure to supply the decoded color differential data PR to the interpolation circuit 37 and the decoded color differential data PB to the interpolation circuit 38. The interpolation circuit 37, by the interpolation processing in the vertical direction of the screen, outputs the color differential data PR shown in the above FIG. 3C from the output terminal 39, as color differential data PR shown in FIG. 3A. The interpolation circuit 38, by the interpolation processing in the vertical direction of the screen, outputs the color differential data PB shown in the above FIG. 3D from the output terminal 40, as color differential data PB shown in FIG. 3B.

Here, assuming that the ratio of the sampling frequency $f_s$ to the horizontal synchronizing signal frequency $f_h$ is 1:1, the distance between the sample data for DPCM on the screen is 1.25, i.e. 1.25/2 of the conventional figure. Accordingly, the distance on the screen between the sampling data is close and prediction error is small, resulting in the coding with higher image quality than before.

As explained above, the present invention allows the differential coding of sample data having close correlation, so that the prediction error becomes smaller and the coding can be done with improved image quality.

What is claimed is:

1. An image signal processing apparatus, which processes image signals, comprising:
    (a) line sequential output means for simultaneously receiving first image data and second image data both of which are different from each other and each of which comprises a plurality of different sample data and for sequentially outputting the received first and second image data every one horizontal period;
    (b) data thinning-out means for performing a thinning-out processing on sample data output from said line sequential output means in the horizontal direction of a screen so that vertical positions of the sample data on the screen are different from each other between the odd-number field period and the even-number field period, and for outputting the sample data thinning-out processed; and
    (c) prediction coding means for prediction coding the sample data output from said data thinning-out means and for outputting prediction coded data.

2. An apparatus according to claim 1, wherein said first image data color differential data which correspond to one of the two kinds of color differential signals and the second image data are color differential data which correspond to the other.

3. An apparatus according to claim 1, wherein said prediction coding means includes the differential coding circuit which provides differential coding to the sample data output from said data thinning-out means and outputs the differential coding data.

4. An apparatus according to claim 1, wherein said data thinning-out means includes:
    (a) sampling means for sampling the sample data output from said line sequential output means according to the first sampling frequency;
    (b) memory means for memorizing the sample data output from said sampling means in differing memory areas alternately for each field period; and
    (c) output means for reading out the sample data memorized in said memorizing means alternately from the respectively differing memory areas of said memory means with being synchronized with the second sampling frequency which is different from said first sampling frequency and for outputting sample data read out.

5. An apparatus according to claim 4, wherein said frequency of said second sampling is one-half of the frequency of said first sampling.

6. An apparatus according to claim 4, further comprising:
    (a) prediction decoding means for prediction decoding the prediction coding data output from said prediction coding means and for outputting decoded data;
    (b) memory means for memorizing the sample data output from said prediction decoding means in respectively differing memory areas alternately with being synchronized with the second sampling frequency;
    (c) second sample data output means for reading out the sample data memorized in said memory means from the memory areas of respectively differing memory means for each field period alternately, and for outputting the data read out; and
    (d) interpolation means for performing an interpolation processing on the sample data output from said second sample data output means to reproduce said first image data and the second image data and for simultaneously outputting reproduced first and second image data.

7. An apparatus according to claim 6, wherein said interpolation means includes:
    (a) horizontal interpolation processing means for performing an interpolation processing on the sample data output from said second sample data output means in horizontal direction of the screen and for alternately outputting processed sample data for each horizontal period; and
    (b) vertical interpolation processing means for performing an interpolation processing on the sample data output alternately from said horizontal interpolation processing means in vertical direction of the screen to reproduce said first image data and said second image data and for simultaneously outputting reproduced data.

8. An image signal processing apparatus which processes image signals, comprising:
    (a) line sequential output means for simultaneously receiving first image data and second image data both of which are different from each other and each of which comprises a plurality of different sample data and for sequentially outputting the received first and second image data every one horizontal period;
    (b) data thinning-out means for performing a thinning-out processing on sample data output from said line sequential output means in the horizontal direction of a screen so as to interleave a position of the sample data of the odd-number field screen and a position of the sample data of the even-number field screen and for outputting the sample data thinning-out processed; and
    (c) prediction coding means for prediction coding the sample data output from said data thinning-out means and for outputting prediction coded data.

9. An apparatus according to claim 8, wherein said first image data are the color differential data which correspond to one of the two kinds of color differential signals, and said second image data are color differential data which correspond to the other.

10. An apparatus according to claim 8, wherein said prediction coding means includes a differential coding circuit which differentially codes the sample data output from said data thinning-out means and outputs the differential coded data.

11. An apparatus according to claim 8, wherein said data thinning-out means includes:
  (a) sampling means for sampling the sample data output from said line sequentially output means according to the first sampling frequency and for outputting sample data;
  (b) memory means for memorizing the sample data output from said sampling means respectively in differing memory areas for each field period alternatively; and
  (c) first sample data output means for reading out the sample data memorized by said memorizing means from the differing memory areas of said memory means by synchronizing with the second sampling frequency which is different from said first sampling frequency alternately and for outputting read out data.

12. An apparatus according to claim 11, wherein said frequency of said second sampling is one-half of the frequency of said first sampling.

13. An apparatus according to claim 11, further comprising:
  (a) prediction decoding means for prediction decoding the prediction coding data output from said prediction coding means and for outputting decoded data;
  (b) memory means for memorizing the sample data output from said prediction decoding means with being synchronized with the second sampling frequency respectively in differing memory areas alternately;
  (c) second sample data output means for alternately reading out the sample data memorized in said memory means from the differing memory areas of said memorizing means for each field period and for outputting data read out; and
  (d) interpolation means for performing an interpolation processing on the sample data output from said second sample data output means to reproduce said first image data and said second image data and for outputting said reproduced first and second image data simultaneously.

14. An apparatus according to claim 13, wherein said interpolation means includes:
  (a) horizontal interpolation processing means for performing an interpolation processing on the sample data output from said second sample data output means in horizontal direction of the screen and for alternately outputting processed data for each horizontal period; and
  (b) vertical interpolation processing means for performing an interpolation processing on the sample data output alternately from said horizontal interpolation processing means in vertical direction of the screen to reproduce said first image data and said second image data and for simultaneously outputting the reproduced first and second image data.

* * * * *